L. F. DONNELLY.
TOILET UTENSIL.
APPLICATION FILED AUG. 20, 1918.
1,312,896.
Patented Aug. 12, 1919.
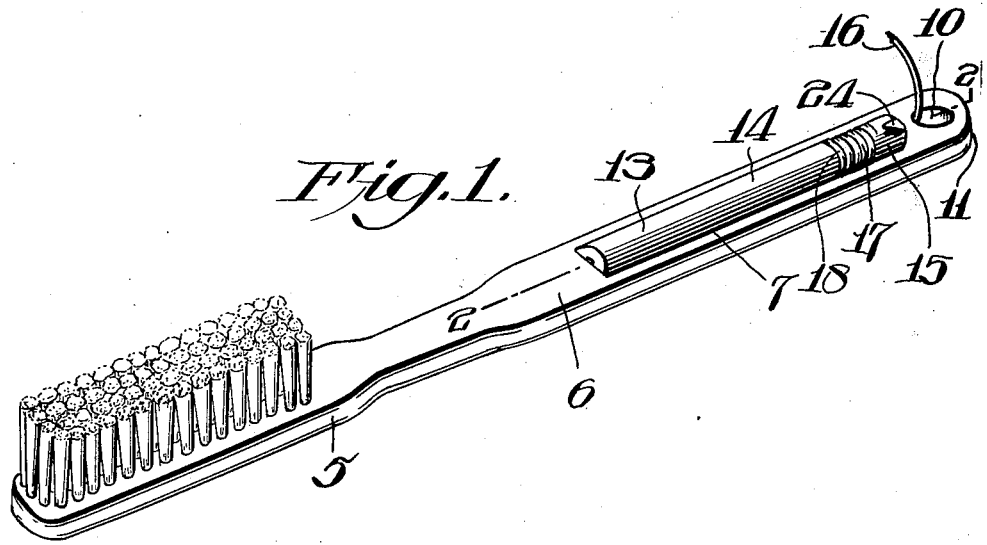
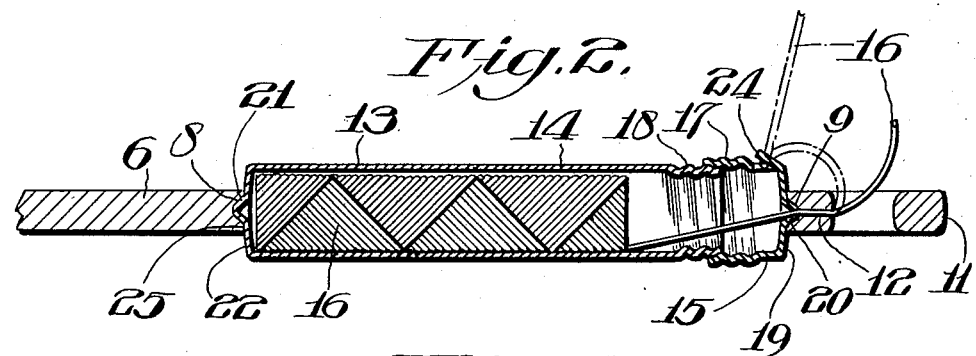
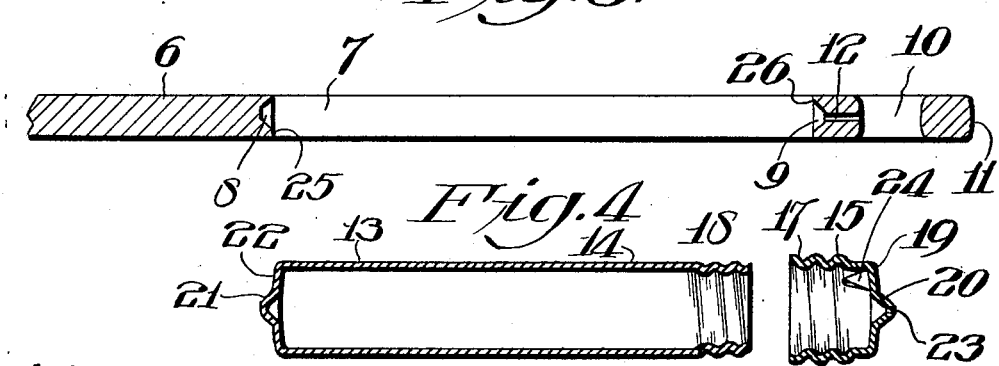
Witnesses:
E. E. Reichart
Augustus B. Copper
Inventor
Laurence F. Donnelly
By Joshua R. H. Toth
his Attorney

UNITED STATES PATENT OFFICE.

LAURENCE F. DONNELLY, OF LANSFORD, PENNSYLVANIA.

TOILET UTENSIL.

1,312,896.  Specification of Letters Patent.  Patented Aug. 12, 1919.

Application filed August 20, 1918. Serial No. 250,643.

*To all whom it may concern:*

Be it known that I, LAURENCE F. DONNELLY, a citizen of the United States, residing at Lansford, in the county of Carbon and State of Pennsylvania, have invented certain new and useful Improvements in Toilet Utensils, of which the following is a specification.

One object of my invention is to provide a combined tooth brush and dental floss holder which can be conveniently used and which will be constructed in such manner that the presence of the dental floss holder will not interfere with the proper manipulation of the brush while cleaning the teeth.

Another object is to so construct my invention that the dental floss holder can be quickly and easily secured to the handle of the tooth brush and when thus secured will not accidentally become loosened.

A further object is to construct my invention in such manner that it will not require a tooth brush to have a handle of abnormal length in order to permit its proper attachment thereto.

A still further object is to construct my invention in such manner that the parts will be so constructed and can be removed in such manner as to permit the ready cleaning of the parts from time to time.

Another object is to construct my invention in such manner that the floss can be easily pulled therefrom and cut by means provided by my invention.

These objects, and other advantageous ends which will be described hereinafter, I attain in the following manner, reference being had to the accompanying drawings in which Figure 1 is a perspective view of my invention, Fig. 2 is an enlarged sectional view taken on the line 2—2 of Fig. 1, Fig. 3 is a view of similar nature to Fig. 2 with the dental floss container removed, and Fig. 4 is a sectional view of the dental floss container which is made in two sections, and illustrating the sections disconnected.

Referring to the drawings, 5 represents a tooth brush having a handle 6. An elongated slot 7 is formed in the handle 6 and extends in the direction of the length of the handle. This slot, as illustrated, extends entirely through the thickness of the handle 6 and at its opposite ends has frusto-conical recesses 8 and 9.

A hole 10 extends through the thickness of the handle and is located between the recess 9 and the end 11 of the handle 6. A duct 12 leads centrally from the recess 9 to the hole 10, for a purpose hereinafter described.

A dental floss container 13 is made in two sections 14 and 15. This container is preferably made of metal, glass, or other suitable material, and the section 14 is hollow to permit the insertion of a spool or cop 16 of dental floss thread. The section 15 forms a cap and is screw threaded at 17 to fit a screw threaded portion 18 of the section 14 so that when the section 15 is screwed on the section 14, the cop of dental floss thread 16 will be retained therein.

The end 19 of the section 15 has a centrally projecting extension 20 which, after the container 13 is inserted within the slot 7 of the tooth brush handle 6, serves as a trunnion having its bearing in the recess 9. The section 14 also has on extension 21 projecting from its opposite closed end 22 and this extension 21 serves as a trunnion and has its bearing in the recess 8 in the handle 6.

The trunnion 20 of the cap section 16 has a hole 23 adapted to register with the duct 12 so that the dental floss thread can be pulled through the hole 23, duct 12, and hole 10 in a manner clearly shown in Figs. 1 and 2. The cap section 15 has a lip 24 cut therein and pressed outwardly to form a cutter for the dental floss thread, as illustrated in dot-and-dash lines in Fig. 2.

To assemble the parts of my invention, the spool or cop of dental floss thread is inserted within the section 14 and the free end of the thread is pushed out of the hole 23 of the cap section 15. The cap section 15 is then screwed on the section 14 until the distance between the extreme outer ends of the trunnions 20 and 21 is less than the distance between the ends 25 and 26 of the slot 7. The container thus assembled is pushed into the slot until the trunnions 21 and 20 are in alinement with the respective recesses 8 and 9. The sections 14 and 15 are then turned in opposite directions in a manner as if the sections were to be again separated. In so doing the trunnion 21 will be moved into the recess 8 and the trunnion 20 will be moved into the recess 9. Thus the container 13 will be firmly clamped to the handle 6 within the slot 7.

By the construction and manner of assembly of the parts as above described, a part of the thickness of the container, which is preferably made cylindrical in shape, will be located within the thickness of the handle 6 and will not interfere with the proper manipulation or gripping of the handle 6 when the device is being used as a brush to clean the teeth.

When the dental floss thread is not being used it can be clamped by catching the free end around the lip 24 and the free end will thus be held out of the way while the brush is being used to clean the teeth or when the brush is not being used.

Both of the container sections 14 and 15 can be made of metal or, if desired, the section 14 can be made of glass and the cap section 15 can be made of metal so as to provide durable cutting material for the lip 24.

The container can be easily removed from the tooth brush handle 6 by turning the sections 14 and 15 in opposite directions until the trunnions 20 and 21 have disengaged themselves from the recesses or bearings 8 and 9. The entire container will then fall out of the slot 7.

The handle 6 thus provides a holder for the container 13 in such manner that the container can be quickly inserted and removed for cleaning purposes or to permit replenishment of the dental floss thread.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A toilet utensil having a portion provided with a slot; and a dental floss container mounted within said slot; said container being made in sections adapted to be expanded within said slot so as to clamp the container to the holder; said portion, at opposite ends of said slot, having parts adapted to retain the opposite ends of said container when thus expanded; substantially as described.

2. A toilet utensil having a portion provided with a slot; and a dental floss container mounted within said slot; said slot having recesses in its opposite ends; said container being made in overlapping sections, each of said sections having an extension adapted to project respectively into said recesses when said sections are relatively moved to lengthen the container whereby the container is prevented from falling out of said slot; substantially as described.

3. A toilet utensil having a portion provided with a slot; and a dental floss container mounted within said slot, said slot having recesses in its opposite ends, said container being made in sections screw threaded together, each of said sections having an extension adapted to project respectively into said recesses when said screw threaded sections are turned in opposite directions to lengthen the container whereby the container is prevented from falling out of said slot, substantially as described.

4. A toilet utensil having a portion provided with a slot; and a dental floss container mounted within said slot, said slot having recesses in its opposite ends, said container being made in sections screw threaded together, each of said sections having an extension adapted to project respectively into said recesses when said screw threaded sections are turned in opposite directions to increase the length of the container whereby the container is prevented from falling out of said slot, said portion having a duct therein, one of said extensions having a hole in alinement with said duct whereby thread can be pulled from said container through said hole in the extension and said duct, substantially as described.

5. A toilet utensil having a portion provided with a slot; and a dental floss container mounted within said slot, said slot having recesses in its opposite ends, said container being made in sections screw threaded together, each of said sections having an extension adapted to project respectively into said recesses when said screw threaded sections are turned in opposite directions, said portion having a duct therein, one of said extensions having a hole in alinement with said duct whereby thread can be pulled from said container through said hole in the extension and said duct, said portion having a hole with which said duct communicates and through which said thread can be pulled, substantially as described.

6. A toilet utensil including a handle having a slot; a container mounted within said slot, said slot providing an entrance whereby the container can be inserted therein in the direction of the thickness of the handle; said handle and container jointly providing means for preventing the container from falling out of said slot; substantially as described.

7. A utensil including a tooth brush having a handle with a slot extending through the entire thickness of the handle; and a dental floss container mounted within said slot and of a thickness greater than the thickness of the handle; said handle and container jointly providing means whereby the container is prevented from falling out of said slot; substantially as described.

In testimony whereof I have signed my name to this specification in the presence of two subscribing witnesses.

LAURENCE F. DONNELLY.

Witnesses:
 HOWARD ALBERT,
 W. C. SCOTT.

Copies of this patent may be obtained for five cents each, by addressing the "Commissioner of Patents, Washington, D. C."